Patented Nov. 1, 1932

1,886,268

UNITED STATES PATENT OFFICE

ARTHUR SPRENGER, OF BERLIN-KARLSHORST, GERMANY

METHOD FOR PRODUCING REFRACTORY BODIES

No Drawing. Application filed July 6, 1931, Serial No. 549,124, and in Germany October 10, 1927.

This invention relates to a method for producing refractory bodies, such as stones, blocks, plates and the like. The bodies according to the invention are produced from granular material or from material in lumps, and they are moulded after mixing with a bond and subsequently burned.

According to the invention chromium-iron-magnesia-compounds, or chromite, magnesite or mixtures of these in finest state are employed as binding substances, i. e. for the binding of molten masses in granulated condition, containing as chief constituent magnesia or alumina or both substances. The base substance is for example mixed with the cromite or also with other substances containing chromium oxide formed into moulded bodies, preferably by pressing and the like, after which these bodies are burned at such temperatures, that softening of the bond, chromium-iron-magnesium compounds, chromite, magnesite or the like, occurs.

Masses or grains produced in the melting process, which contains as main constituent magnesia, alumina or both substances, if necessary also chromium oxide and silicic acid possess very valuable properties, but, when worked with the usual bonds to moulded bodies in granulated state or as lumps, they possess, owing to the bond, properties which are inferior to those of the base mass.

According to the invention grains or lumps are preferably employed as base mass, which are produced by a melting process and possess such a composition, that the quantity of silicic acid present is less than that required for the monomolecular saturation of the alumina, that magnesia is at least sufficient to monomolecularly saturate the excess of alumina and a portion of the chromium oxide. This proportion is only calculated. Thus preferably chromium oxide and magnesia, calculated in mols, must amount to more than 50% of the mass and the percentage of silicic acid must be little, particularly in presence of lime.

The bonds to be utilized according to the invention, such as chromium-iron-magnesia compounds, chromite, magnesite and the like, may be used in smaller quantities (about 2–10%), as already these quantities are as a rule amply sufficient for the binding. For example about 6% of chromite worked up as paste is used. The already mentioned chromite and magnesite or also mixtures of spinels containing chromium and magnesia may be mentioned in the first place as chromium-iron-magnesia compounds.

As regards selection of the bond or of the mixture of the bonds, the employment of the material to be produced is decisive; if to be employed in basic furnaces $MgO$ or masses with a high $MgO$ percentage are preferably used.

As the binding effect of the above mentioned substances becomes effective generally only at higher temperatures, it may be necessary to add, for the adhesion of the stones prior to the burning, organic agglutinants, such as glue or other highly molecular compounds or inorganic agglutinants, such as magnesium hydroxide or glyceroboric acid. Such inorganic agglutinants are especially suitable for this purpose which, at the burning of the stones, evaporate more or less.

The moulding is effected in the usual manner by hand or mechanically, and also the burning is carried out in the kilns commonly used for the production of refractory products. The excellent properties of the several bodies are shown by the results of tests for softening under load.

Granular base mass, produced in the melting process and by disintegration of the product from smelting, containing silicic acid in smaller quantity than sufficient for the monomolecular saturation of the alumina, and magnesia in such quantity that the alumina and at least a portion of the chromium oxide appears monomolecularly saturated, bound with:

(a) waterglass shows a commencement of the softening under load at 1330° and less, (b) kaolin a commencement of the softening under load at 1370°, (c) (according to the invention) chromium ore a commencement of the softening under load at 1590°.

The experiments have been carried through at uniform loading of 2 kg. per sq. cm.

I claim:—

1. A method of producing refractory bodies, such as stones, blocks, plates and the like, from masses produced in the smelting process, consisting in admixing to molten masses, containing as main constituents magnesia and alumina, in granulated state, small quantities of chromium-iron-magnesia compounds in fine condition, moulding the mixture and burning the bodies.

2. A method of producing refractory bodies, such as stones, blocks, plates and the like, from masses produced in the smelting process, consisting in admixing to a disintegrated base mass produced in the smelting process, in which mass the percentage of silicic acid is less than necessary for the monomolecular saturation of the alumina, that of magnesia is at least sufficient to monomolecular saturation of the alumina, that of magnesia is at least sufficient to monolecularly saturate the excess in alumina and a portion of the chromium oxide, small quantities of chromium - iron - magnesium - compounds in fine condition, moulding the mixture and burning the bodies.

3. A method of producing refractory bodies, such as stones, blocks, plates and the like, from masses produced in the smelting process, consisting in admixing to molten masses containing as main constituents magnesia and alumina in granulated state small quantities of chromite in fine condition, moulding the mixture and burning the bodies.

4. A method of producing refractory bodies, such as stones, blocks, plates and the like, from masses produced in the smelting process, consisting in admixing to molten masses containing as main constituents magnesia and alumina in granulated state small quantities of magnesia in fine condition, moulding the mixture and burning the bodies.

5. A method of producing refractory bodies, such as stones, blocks, plates and the like, from masses produced in the smelting process, consisting in admixing to molten masses containing as main constituents magnesia and alumina in granulated state small quantities of chromium - iron - magnesium compounds in fine form and substances which at low temperatures have an adhesive effect, moulding the mixture and burning the bodies.

6. A method of producing refractory bodies, such as stones, blocks, plates and the like, from masses produced in the smelting process, consisting in admixing in molten masses containing as main constituents magnesia and alumina in granulated state small quantities of chromium-iron-magnesia compounds in fine state and substances which at low temperatures have an adhesive effect and evaporate during the burning, moulding the mixture and burning the bodies.

7. A method of producing refractory bodies, such as stones, blocks, plates and the like, from masses produced in the smelting process, consisting in admixing to molten masses containing as main constituents magnesia and alumina in granulated state small quantities of chromium-iron-magnesia compounds in fine state in moulding the mixture and in burning the bodies at such temperatures that softening of the bond occurs.

In testimony whereof I affix my signature.

ARTHUR SPRENGER.

CERTIFICATE OF CORRECTION.

Patent No. 1,886,268.                                      November 1, 1932.

ARTHUR SPRENGER.

It is hereby certified that error appears in the printed specification of the above numbered patent requiring correction as follows: Page 2, lines 18 to 20, claim 2, strike out the words "that of magnesia is at least sufficient to monomolecular saturation of the alumina,"; and line 41, claim 4, for "magnesia read "magnesite"; and that the said Letters Patent should be read with these corrections therein that the same may conform to the record of the case in the Patent Office.

Signed and sealed this 27th day of December, A. D. 1932.

(Seal)                                                        M. J. Moore,
Acting Commissioner of Patents.